United States Patent [19]

Smerecziak et al.

[11] Patent Number: 5,694,766

[45] Date of Patent: Dec. 9, 1997

[54] METHOD AND APPARATUS FOR CONTROLLING THE THROAT AREA, EXPANSION RATIO AND THRUST VECTOR ANGLE OF AN AIRCRAFT TURBINE ENGINE EXHAUST NOZZLE USING REGIONS OF LOCALLY SEPARATED FLOW

[75] Inventors: Philip Smerecziak, St. Peters; David R. Spetnagel, St. Charles, both of Mo.

[73] Assignee: McDonnell Douglas Corporation, St. Louis, Mo.

[21] Appl. No.: 411,479

[22] Filed: Mar. 28, 1995

[51] Int. Cl.⁶ ............................... F02K 1/12; F02K 1/30
[52] U.S. Cl. ........................... 60/204; 60/230; 60/231; 239/265.17; 239/265.19; 239/265.23
[58] Field of Search ............................... 60/228, 230, 231, 60/271, 204; 239/265.17, 265.19, 265.23

[56] References Cited

U.S. PATENT DOCUMENTS

| | | |
|---|---|---|
| 2,952,123 | 9/1960 | Rich ............................... 60/231 |
| 3,020,714 | 2/1962 | Eggers et al. ............................... 60/271 |
| 3,659,422 | 5/1972 | Hope . |
| 4,088,270 | 5/1978 | Maiden . |
| 4,449,678 | 5/1984 | Hapke . |
| 4,451,015 | 5/1984 | Hapke . |
| 5,165,227 | 11/1992 | Grieb . |
| 5,267,435 | 12/1993 | Frenkel et al. . |

FOREIGN PATENT DOCUMENTS 444103   3/1936   United Kingdom ............... 60/231

Primary Examiner—Michael Koczo
Attorney, Agent, or Firm—Bell, Seltzer, Park & Gibson, P.A.

[57] ABSTRACT

A method and apparatus for controlling the throat area, expansion ratio and thrust vector of an aircraft turbine engine exhaust nozzle, includes means, such as deflectors and/or injected air, for producing and controlling regions of locally separated flow. The exhaust nozzle also allows control of the thrust vector angle defined by the gas exiting the nozzle to provide increased directional control of the aircraft.

25 Claims, 3 Drawing Sheets

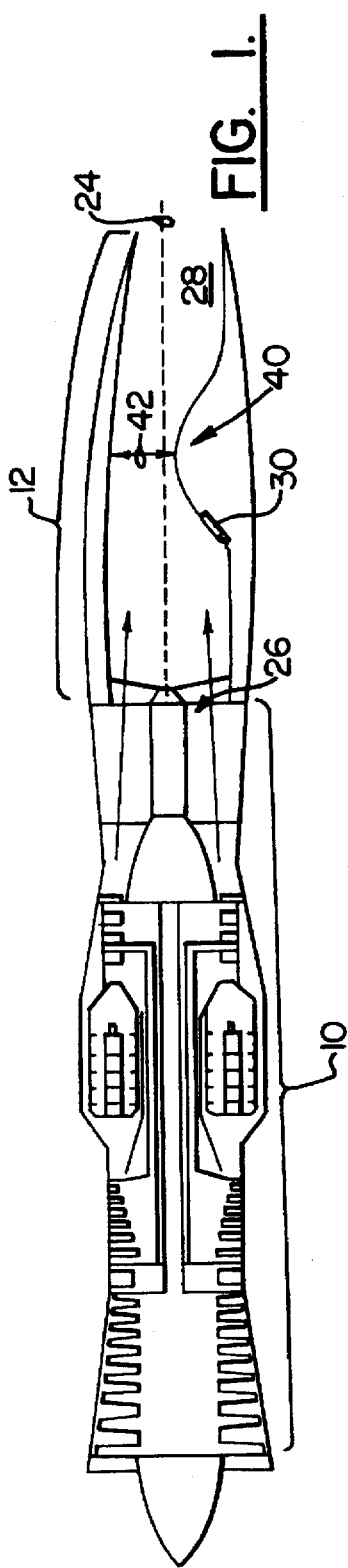
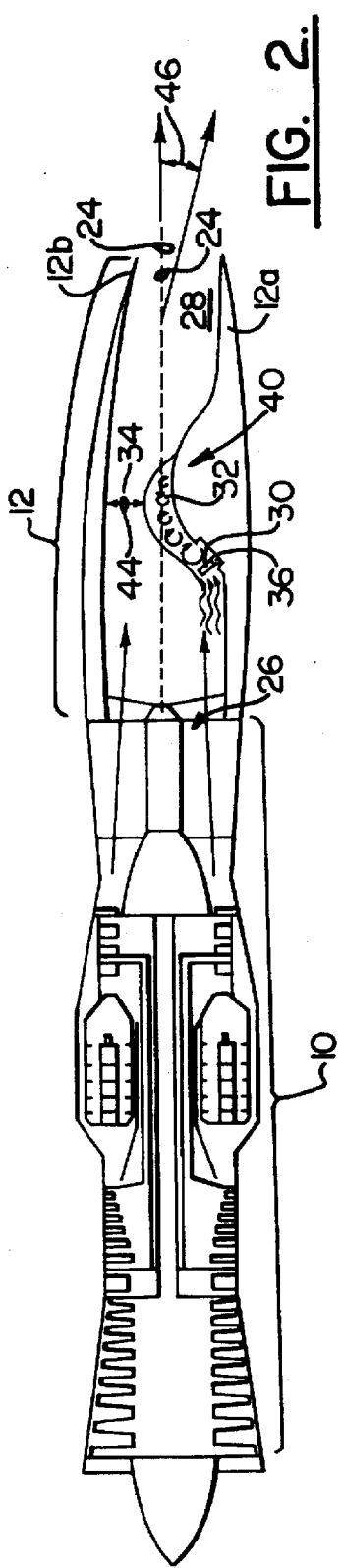
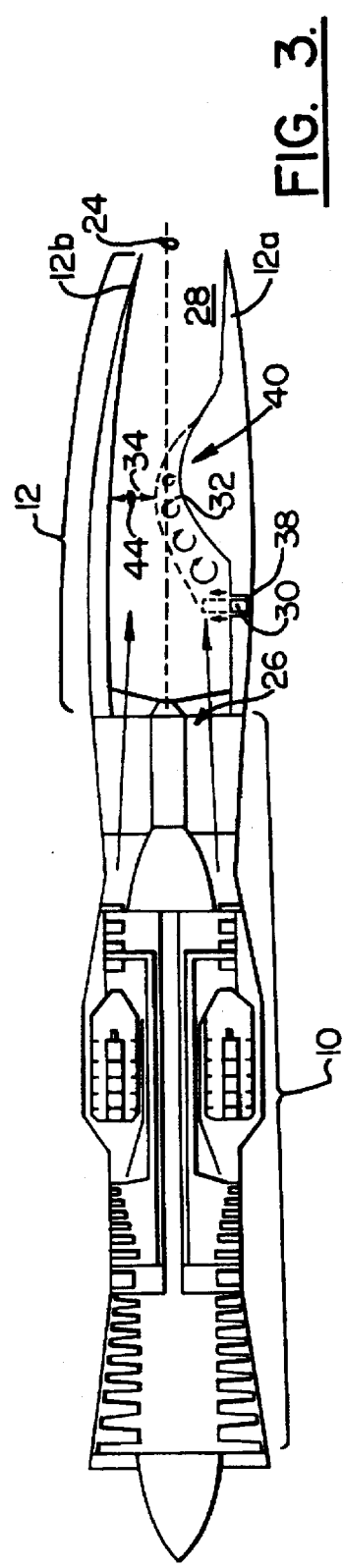

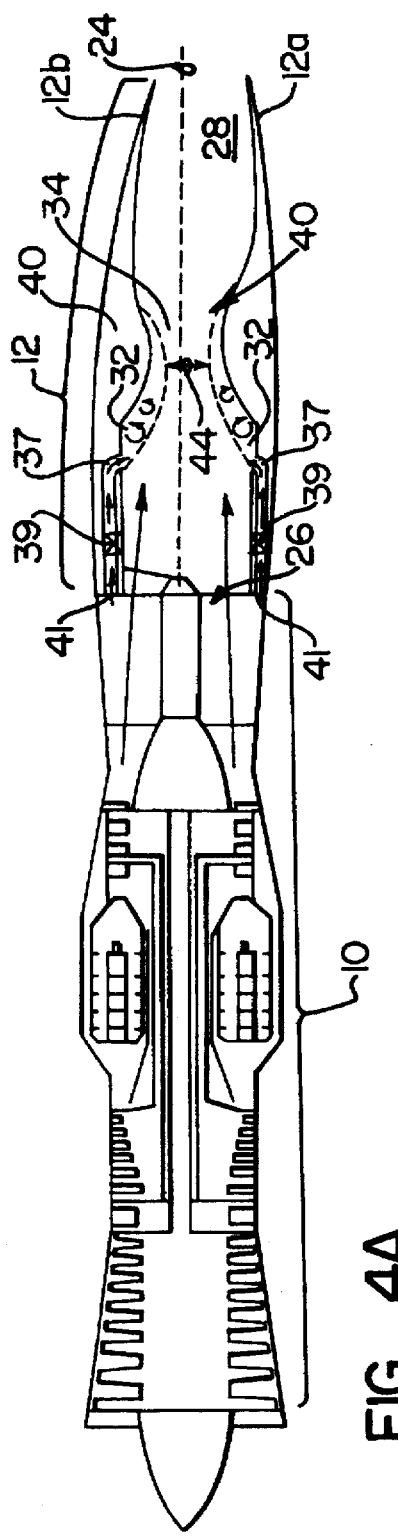
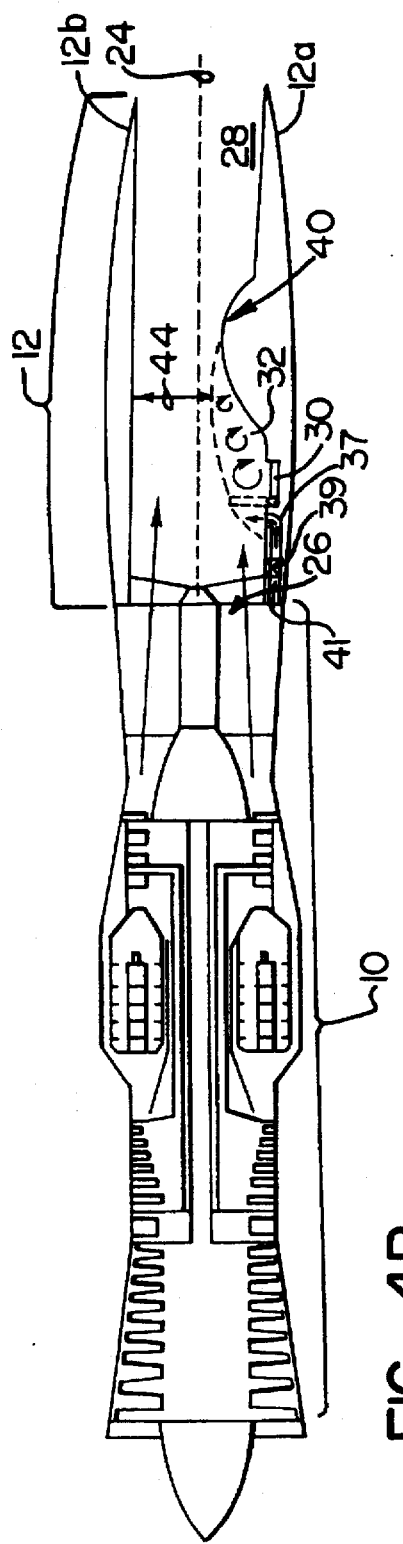
FIG. 4A.
FIG. 4B.

5,694,766

METHOD AND APPARATUS FOR CONTROLLING THE THROAT AREA, EXPANSION RATIO AND THRUST VECTOR ANGLE OF AN AIRCRAFT TURBINE ENGINE EXHAUST NOZZLE USING REGIONS OF LOCALLY SEPARATED FLOW

FIELD OF THE INVENTION

The present invention relates generally to a method and apparatus for controlling an aircraft turbine engine exhaust nozzle throat area and, more particularly, to a method and apparatus for controlling an aircraft turbine engine exhaust nozzle throat area using local regions of separated flow.

BACKGROUND OF THE INVENTION

Aircraft engines for modern military and high speed commercial aircraft employ exhaust nozzles to control engine exhaust expansion and velocity distribution. By controlling engine exhaust expansion and velocity distribution, the engine exhaust nozzles provide relatively high thrust efficiency and thrust vectoring capability.

These modern aircraft engines commonly include an afterburner to provide increased thrust required during operations such as takeoff, rapid ascents in altitude, and air combat maneuvers. For example, turbojet and turbofan aircraft engines, such as those manufactured by General Electric Co. and Pratt and Whitney, can include an afterburner. An aircraft engine having an associated afterburner can operate either in a non-afterburning or dry mode, or in an afterburning mode. Due to the increased fuel consumption of an aircraft engine in afterburning mode, however, the engine typically operates in dry mode with afterburning operation initiated only in instances in which additional thrust is required.

A conventional afterburner is located upstream of the engine exhaust nozzle and immediately downstream of an aircraft engine, to receive the exhaust from the aircraft engine. The exhaust from the aircraft engine consists of hot, high pressure gas. Within the afterburner, additional fuel is injected into the gas received from the engine. By igniting the mixture, additional thrust for the aircraft is produced. Due to the recombustion of the mixture, the gas exhausted during afterburning operation of the aircraft engine has higher temperature than the gas produced during non-afterburning or dry operation of the aircraft engine.

The principle control on the discharge of the heated gas from a jet engine is the throat area of the nozzle. The throat area is defined as the minimum area through which the heated gas must pass to be discharged from the engine. Moreover, due to the increased heat of the gas to be discharged during afterburning operation of the aircraft engine, the throat area during afterburning operation is generally larger than the throat area of an aircraft engine in dry mode.

The size of the throat area is typically controlled by complex, moving, mechanical systems. These systems usually consist of flaps which are moved by hydraulic actuators. The flaps are commonly arranged to form a throat area which is circular or rectangular in cross-sectional shape. The nozzle of an afterburning engine also generally includes a number of seals which must be adapted to withstand the high temperatures to which the engine exhaust nozzle is subjected. The flaps of a typical nozzle are relatively heavy since they are exposed to hot gas under high pressures and, thus, must be adapted to withstand significant thermal and mechanical forces and loads.

The mechanism which controls the size of the throat area also generally controls the vector angle at which the exhaust gas leaves or exits the nozzle. The throat control mechanism therefore determines, at least in part, the vector angle of the thrust and the use and control of these forces for aircraft control purposes. However, such thrust vector control elements further increase the complexity, weight and cost of engine nozzles.

SUMMARY OF THE INVENTION

It is therefore an object of the invention to provide an improved method and apparatus for controlling the throat area of an aircraft turbine engine exhaust nozzle.

It is also an object of the invention to provide an improved method and apparatus for controlling the expansion ratio and thrust vector angle of an aircraft turbine engine exhaust nozzle.

These and other objects are provided, according to the invention, by an aircraft propulsion apparatus having an aircraft engine and an associated exhaust nozzle which includes means for deflecting at least some of the gas flowing through the exhaust nozzle to produce a separated flow region and a second region having relatively low and high gas flow rates, respectively. The throat area of the exhaust nozzle can thus be controllably defined by the transverse cross-sectional area of the second region.

The exhaust nozzle also preferably includes means for smoothly expanding the gas following its deflection such that the expansion ratio and thrust vector angle of the exhaust nozzle can also be controlled by the method and apparatus of the present invention. The means for smoothly expanding the deflected gas preferably includes a ridge projecting inwardly within the nozzle. The ridge is preferably downstream of the deflecting means and has a smoothly sloped profile in longitudinal cross-section.

The aircraft engine preferably ignites a first mixture of air and fuel and exhausts the first mixture following its combustion. The exhaust nozzle thus preferably includes inlet means, such as an inlet port, for receiving the exhausted first mixture from the aircraft engine. The exhaust nozzle also preferably includes outlet means, such as a nozzle exit, for discharging the gas flowing through the nozzle.

In one embodiment, the means for deflecting at least some of the gas received by the inlet means includes a deflector and an associated actuating means. The actuating means projects the deflector into the flow pattern of the gas such to alter the flow pattern of at least some of the gas, thereby creating the regions of relatively high and relatively low gas flow rates. In another embodiment, the means for deflecting at least some of the gas includes means for injecting air into the flow pattern of the gas to alter the flow pattern of at least some of the gas. In other embodiments, the means for deflecting may include both a deflector and a means for injecting air such that the combination thereof alters the flow pattern of at least some of the gas.

The deflecting means also preferably includes control means for varying the thrust vector angle defined by the gas exiting the nozzle through the outlet means. The control means preferably includes a plurality of deflectors circumferentially positioned within the nozzle and actuating means for individually extending the deflectors within the nozzle and into the flow pattern of the gas. The extended deflectors, thus, alter the flow pattern of at least some of the gas. The control means also preferably includes means for controlling the actuating means such that only predetermined deflectors are extended within the nozzle.

Advantageously, for deflecting means including one or more deflectors, the amount by which the deflectors are projected into the flow pattern of the gas is controlled such that the relative sizes of the regions of high and low gas flow rates and, thus, the throat area and the expansion ratio of the exhaust nozzle can be controlled. Alternatively, for deflecting means including means for injecting air, the air injected into the flow pattern is preferably controlled such that the throat area and the expansion ratio of the exhaust nozzle is controlled.

In one embodiment, the aircraft propulsion apparatus of the present invention includes an afterburner associated with the aircraft engine and including the exhaust nozzle of the present invention. In this embodiment, the afterburner includes injecting means for introducing additional fuel into the exhausted first mixture to form a second mixture and combustion means for igniting the second mixture during afterburning operation of the aircraft engine. Thus, the thrust of the aircraft engine can be increased while still deflecting and smoothly expanding the gas flowing through the exhaust nozzle such that the throat area, expansion ratio and thrust vector angle of the aircraft engine are controlled.

Therefore, an aircraft propulsion apparatus of the present invention having an aircraft engine and an associated exhaust nozzle can control the size of the throat area, expansion ratio and thrust vector angle of the aircraft engine. Thus, the exhaust nozzle can efficiently provide additional steering or directional control to the aircraft. In addition, the means for deflecting and smoothly expanding the flow pattern of the gas are within the exhaust nozzle and are, thus, protected from external thermal and mechanical forces. The exhaust nozzle of the present invention also eliminates the numerous moving flaps and other associated components employed by conventional afterburners. Accordingly, the design and manufacture of the exhaust nozzle of the present invention is simplified, the reliability is improved and the signature of the exhaust nozzle is reduced due to the reduction in moving parts.

BRIEF DESCRIPTION OF THE DRAWINGS

FIG. 1 is a transverse cross-sectional view of an aircraft turbine engine of the present invention during afterburning operation.

FIG. 2 is a transverse cross-sectional view of an aircraft turbine engine of the present invention during dry operation illustrating a deflector which is rotated into the exhaust flow to produce separation.

FIG. 3 is a transverse cross-sectional view of an aircraft turbine engine of the present invention having a deflector which extends from a slot in a wall of the nozzle.

FIG. 4A is a transverse cross-sectional view of an aircraft turbine engine of one embodiment of the present invention which includes a plurality of ports through which gas in injected in order to deflect at least some of the gas flowing through the exhaust nozzle.

FIG. 4B is a transverse cross-sectional view of an aircraft turbine engine of the present invention which includes both a mechanical deflector and a port through which gas is injected into the exhaust nozzle.

DESCRIPTION OF THE PREFERRED EMBODIMENT

Figure 4:
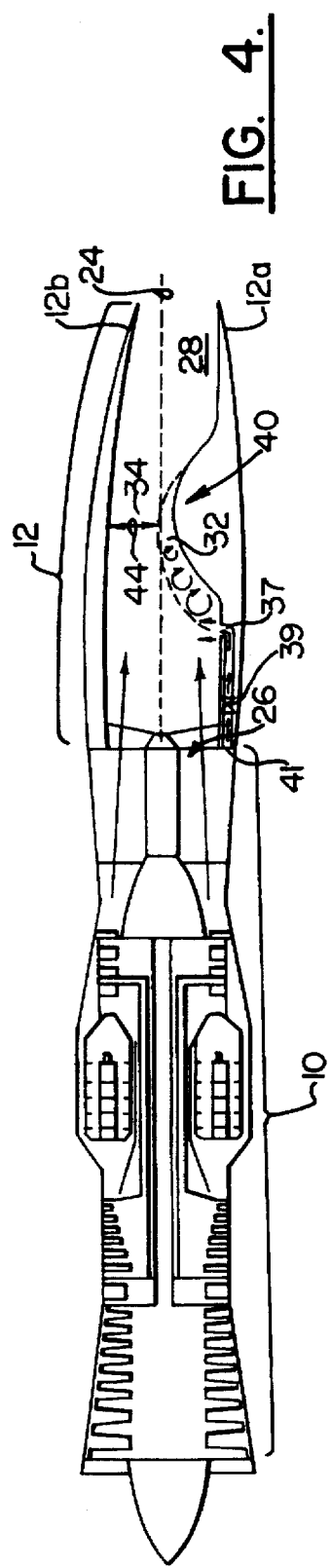
FIG. 4 is a transverse cross-sectional view of an aircraft turbine engine of the present invention including means for injecting gas to produce or augment separation.

The present invention will now be described more fully hereinafter with reference to the accompanying drawings, in which a representative embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, an aircraft engine, such as a turbojet engine 10, and an associated exhaust nozzle 12 is illustrated. The exhaust nozzle 12 includes means for deflecting and then smoothly expanding the gas flowing therethrough such that the thrust of the aircraft engine is increased. While the illustrated embodiment and the following description describe the method and apparatus of the present invention in conjunction with an aircraft engine having an associated afterburner, the aircraft propulsion method and apparatus need not include an afterburner, but can instead include only an aircraft engine and an associated exhaust nozzle.

In addition, while a turbojet engine 10 is illustrated, other compatible aircraft engines known to those skilled in the art, such as turbofan aircraft engines can also be employed without departing from the spirit and scope of the present invention. Further, the aircraft engine 10 need not be adapted to perform afterburning as illustrated, but can instead be a non-afterburning or dry aircraft engine. The design and components of such conventional aircraft engines are well known to those skilled in the art and, consequently, will not be discussed in detail herein.

The exhaust nozzle 12 of the present invention generally defines a longitudinal axis 24 and has a first end having inlet means, such as an inlet port 26, and a second end having outlet means, such as a nozzle exit 28. The exhaust nozzle can have various shapes in transverse cross-section, such as, for example, rectangular or circular.

Figure 6:
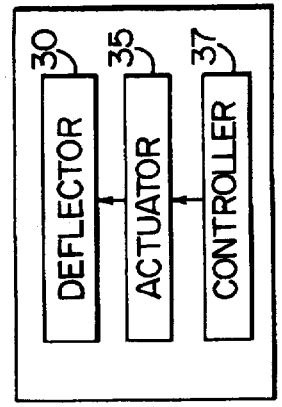
FIG. 6 is a block diagram illustrating the components of the deflecting means of the present invention for producing local separated flow regions.

The exhaust nozzle 12 also includes means for deflecting at least some of the generally hot, high pressure gaseous mixture flowing therethrough to produce a separated flow regions 32 which reduces the effective throat area 34 of the nozzle. In the embodiment illustrated in FIGS. 1 and 2 and schematically in FIG. 6, the means for deflecting at least some of the gaseous mixture includes a deflector 30 and an associated actuating means, such as an actuator 35, and a control means, such as a controller 37, for projecting the deflector into the flow of the gas. Accordingly, the deflector 30 alters the flow pattern of at least some of the gas to produce local flow separation, i.e, separation of the majority of the gas flowing through the nozzle from the sidewall of the nozzle from which the deflector extends downstream of the deflector. This local flow separation, in turn, reduces the throat area 34 of the nozzle.

The deflector 30 can include a fin which may be rotated from a stowed position, as shown in FIG. 1, in which the fin is recessed in a cavity 36 defined in an interior wall of the exhaust nozzle 12 to an extended position, as shown in FIG. 2, in which the fin projects inwardly within the nozzle and into the flow pattern of the gas flowing therethrough.

Accordingly, the actuating means rotates the fin from the stowed position to the extended position during deployment of the deflector 30.

Alternatively, the deflector 30 can be housed within a radially extending slot 38 defined in a wall of the exhaust nozzle 12 as shown in FIG. 3. In order to deflect the gas flowing through the afterburner, the actuating means extends the fin from a stowed position within the slot to an extended position in which the fin projects inwardly within the exhaust nozzle 12, as illustrated in dashed lines in FIG. 3, to alter the flow pattern of at least some of the gas flowing therethrough.

Other types of deflectors 30 may also be employed to alter the flow pattern of the gas flowing through an exhaust nozzle 12 without departing from the spirit and scope of the present invention. In addition, the actuating means may controllably project the deflector 30 a predetermined amount into the flow pattern of the gas. Thus, the relative size of the separated flow region 32 is controllably varied.

While a generally rectangular deflector 30 is illustrated in FIGS. 1, 2 and 3 in conjunction with an exhaust nozzle 12 having a relatively rectangular shape, in transverse cross-section, the shape of the deflector 30 may be varied in relation to the cross-sectional shape of the exhaust nozzle 12 such that the shapes of the deflector 30 and nozzle match. For example, a curved fin may be utilized in conjunction with a cylindrical exhaust nozzle 12 which has a relatively circular shape in transverse cross-section.

In addition, the deflector 30 need not be extended from a lower wall of the exhaust nozzle 12 as illustrated in FIGS. 1, 2 and 3, but can be extended from the upper wall or any other wall of the exhaust nozzle 12. Still further, deflector 30 may be simultaneously extended from more than one wall of the afterburner nozzle as described in detail below.

As described, the method and apparatus of the present invention develops regions of local flow separation in the exhaust stream moving through the nozzle 12. The separated flow region 32 is characterized by flow which recirculates in a small area, rather than flowing smoothly with the remainder of the exhaust gas to exit the nozzle. As such, it is an area through which little or no flow passes so as to reduce the quantity of flow passing through the nozzle. The separated flow region therefore acts as a blockage or reduction in the flow area. These separated flow regions are employed during periods of non-afterburning engine operation to effectively reduce the throat area 34. When afterburning operation is selected, the separated regions are reduced or eliminated so that the full flow area of the nozzle throat can be utilized by the exhaust flow. Therefore, separated flow region 32 can function to control the throat area of a nozzle.

The use of localized flow separated regions 32 for exhaust nozzle throat area control is therefore believed to eliminate or significantly reduce the complexity of nozzle designs. As described hereinafter, flow separation can be induced in various manners and the flow path can be shaped by the deflecting means to increase flow turning locally, thereby increasing the tendency for flow near the nozzle wall to separate.

For example, in another embodiment of the present invention illustrated in FIG. 4, the means for deflecting at least some of the gas flowing through the exhaust nozzle 12 includes means for injecting air into the exhaust nozzle 12 to alter the flow pattern of at least some of the gas. The means for injecting air can include one or more ports or slots 37 in the interior wall of the exhaust nozzle 12 through which gas, such as air, may be injected. In one embodiment shown in FIG. 4A, the ports 37 for injecting air are positioned circumferentially within the exhaust nozzle 12.

In addition, the means for injecting air can include means for controlling the air injected such that the flow pattern of at least some of the gas flowing through the exhaust nozzle 12 and the relative size of the separated flow region 32 is controlled. For illustrative purposes, the means for controlling the injected air is illustrated schematically as a valve 39 in FIG. 4. In particular, the volume and pressure of the air injected into the exhaust nozzle 12 as well as the angle at which the gas is injected relative to the longitudinal axis 24 of the exhaust nozzle 12 can be controlled. For example, a larger separated flow region 32 and, consequently, a smaller effective throat area is produced by a large volume of gas injected along a direction substantially perpendicular to the longitudinal axis 24 of the exhaust nozzle 12.

The air to be injected by the injecting means may be obtained from any number of sources. For example, gas having a relatively high pressure may be siphoned from the exhaust of aircraft engine 10 as illustrated in FIG. 4. In particular, hot compressed gas may be extracted, such as through a port 41, from the aircraft engine 10 following its combustion. Alternatively, air from the surrounding atmosphere may be injected by the injecting means.

In yet another embodiment of the present invention shown in FIG. 4B, the means for deflecting gas flowing through the exhaust nozzle 12 can include both a deflector 30, such as a fin, and means for injecting air into the flow pattern of the gas. The deflector 30, when extended, produces regions of relatively high and relatively low flow rates, 34 and 32, respectively, having predetermined sizes. The injecting means can then introduce air into the flow pattern of the gas flowing through the nozzle to further alter the flow pattern and to increase the size of the separated flow region 32 of relatively low flow rate and to correspondingly decrease the size of the region 34 of relatively high flow rate. By controlling the volume, pressure and angle of the air introduced, the size of the regions of relatively high and relatively low flow rates may be controllably adjusted or tuned.

As illustrated in FIG. 2–5, the deflecting means alters the flow pattern of the gas flowing through the exhaust nozzle 12 and creates regions of relatively high and relatively low flow rate, 34 and 32, respectively. In contrast to conventional aircraft engines in which the airflow generally extends from wall to wall within the nozzle in order to obtain the largest fluid passageway possible in a nozzle of a predetermined size, a deflector 30 or injected airstream of the exhaust nozzle 12 of the present invention separates the gas flowing through the exhaust nozzle from the wall from which the deflector 30 projects or the air is injected to create a separated flow region 32. Accordingly, a majority of the gas flowing through the exhaust nozzle is forced either around the deflector 30 or in the direction of the injected airstream.

Thus, a separation region 32 of relatively low flow rate is formed along the wall of the exhaust nozzle 12, downstream of the deflecting means. As shown in FIGS. 2–5, generally circular currents typically flow within the separation region. Likewise, a region 34 of relatively high gas flow rate is formed within the exhaust nozzle 12, downstream of the deflecting means, and along the opposite wall from that from which the deflector 30 extends or the airstream is injected since the majority of the gas within the exhaust nozzle flows therethrough.

Downstream of the deflecting means, the gas in the regions of relatively high and relatively low gas flow rates gradually mix. In particular, the fluid in the high flow rate region 34 expands into the low flow rate region 32. This expansion is preferably gradual to prevent the creation of a shock wave. A shock wave is generally produced if the gas having a relatively high pressure expands too rapidly and is reflected or rebounds from the wall of the nozzle. A shock wave produces a shock loss which decreases the energy or thrust generated by the aircraft engine 10. Accordingly, the means for smoothly expanding the deflected gas provides a relatively gradual expansion of the gas to prevent or decrease any shock wave produced thereby.

Figure 5:
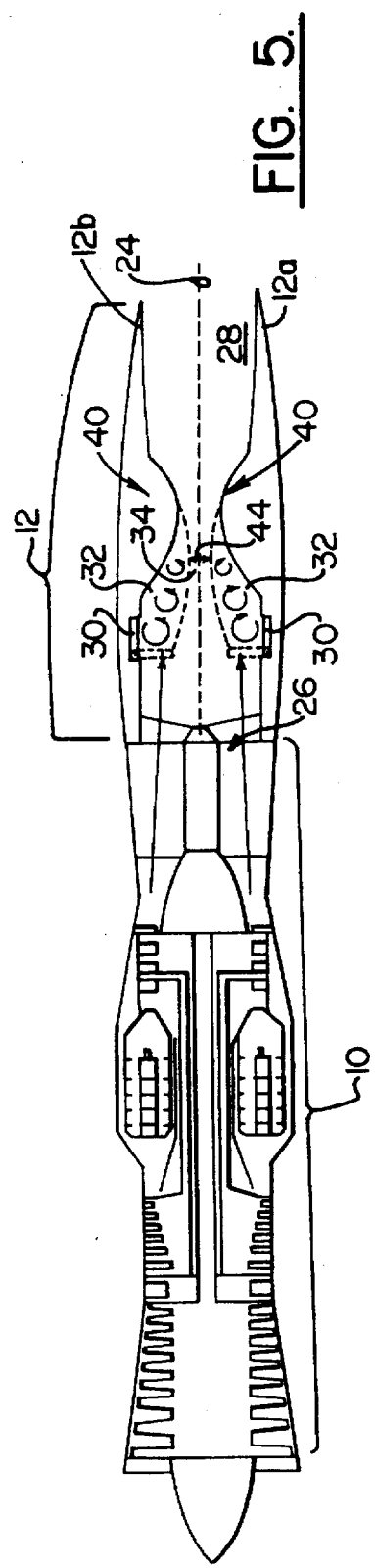
FIG. 5 is a transverse cross-sectional view of an aircraft propulsion apparatus of the present invention including a plurality of circumferentially positioned deflectors.

As illustrated, the means for smoothly expanding the deflected gas preferably includes a ridge 40 projecting inwardly within the exhaust nozzle 12. The ridge 40 has a smoothly sloped profile in longitudinal cross-section to facilitate turning and acceleration of the gas. In addition, the inwardly projecting ridge 40 is preferably immediately downstream of the deflecting means. Although a single inwardly projecting ridge 40 is illustrated, multiple ridges may extend inwardly from one or more of the walls of the exhaust nozzle 12 as shown in FIG. 5, such that a ridge 40 is downstream of each deflector 30 or air injecting means.

The throat area of an aircraft engine 10 and, in particular, of an exhaust nozzle 12 is defined as the minimum area, in transverse cross-section, within the exhaust nozzle 12. As illustrated, while the deflecting means is not employed, the throat area of the exhaust nozzle 12 of the present invention is the transverse cross-sectional area within the exhaust nozzle 12 at the point at which the ridge 40 projects furthest inward. The throat area of an exhaust nozzle 12 in which the deflecting means is not employed is illustrated as line 42 in FIG. 1.

However, during employment of the deflecting means, the throat area of the exhaust nozzle 12 is effectively defined by the minimum transverse cross-sectional area of the region 34 of relatively high flow rate since the vast majority of gas flows therethrough. The throat area of an exhaust nozzle 12 in which deflecting means is employed is illustrated as line 44 in FIGS. 2–5.

Accordingly, the exhaust nozzle 12 of the present invention controls the size of the throat area of the exhaust nozzle 12 by altering the flow pattern of the gas flowing therethrough as explained above. For example, during afterburning operation in which a larger throat area is desired, the deflecting means is generally not employed such that the throat area is the entire transverse cross-sectional area of the exhaust nozzle 12 at the point at which the ridge 40 projects furthest inward. Likewise, during dry operation of the aircraft engine 10 in which a reduced throat area is desirable, the deflecting means can be employed to alter the flow pattern of the gas flowing through the exhaust nozzle 12 and to create regions of separated flow such that the throat area is reduced to the minimum transverse cross-sectional area of the region 34. As an example, the separated region in the area of the transverse cross-sectional area of the exhaust nozzle 12 would be designed to be grown to such a size that could reduce the throat flow area by 35% to handle the full range of flow conditions needed for a typical modern turbine engine.

The exhaust nozzle 12 of the present invention also controls the expansion ratio of the gas flowing therethrough. The expansion ratio of the aircraft engine 10 is generally defined as the ratio of the transverse cross-sectional area of the gas exiting the exhaust nozzle 12 to the throat area of the exhaust nozzle. Thus, for exhaust nozzles 12 having a nozzle exit 28 of a fixed area, the expansion ratio, and thus the thrust of the aircraft engine 10, can be controlled, in part, by varying the throat area of the exhaust nozzle according to the present invention.

The deflecting means of the present invention can also include control means for varying the thrust vector angle defined by the gas exiting the exhaust nozzle 12 through the nozzle exit 28. For example, the alteration of the flow pattern of a gas flowing through the exhaust nozzle 12 by the projection of a deflector 30 from a first wall 12a will force the majority of the gas toward a second wall 12b, opposite the first wall 12a. Thereafter, the gas in the relatively high flow rate region 34 along the second wall produced by the projection of the deflector 30 into the flow pattern will expand toward the first wall 12a of the exhaust nozzle 12. A thrust vector angle is therefore defined according to the flow pattern of the expanding gas. As shown in FIG. 2, the thrust vector angle 46, in the above example, is defined between the longitudinal axis 24 of the exhaust nozzle 12 and the direction of airflow of the expanding gas. In particular, the expanding gas is angularly directed from the second wall 12b toward the first wall 12a.

In one embodiment illustrated in FIG. 5, the control means includes a plurality of deflectors 30 circumferentially positioned within the exhaust nozzle 12, and associated actuating means for individually extending the deflectors 30 within the exhaust nozzle 12 and into the flow pattern of the gas flowing therethrough. The control means also preferably includes means for controlling the actuating means such that only predetermined ones of the deflectors 30 are extended within the exhaust nozzle 12. Accordingly, the thrust vector defined by the exiting gas may be controllably varied by only extending predetermined ones of the deflectors 30.

Thus, by positioning a plurality of deflectors 30 circumferentially within the exhaust nozzle 12 and controllably projecting the deflectors therein, the direction of the thrust vector angle 46 can be varied as desired to provide additional directional control for the aircraft. Alternatively, a plurality of inlet ports 36 for injecting air into the exhaust nozzle 12 can be circumferentially positioned within the exhaust nozzle 12 to alter the flow pattern of the gas and to provide similar control of the thrust vector angle 46. Still further, a combination of deflectors 30 and air inlet ports 36 may be utilized to provide still further control of the thrust vector angle 46. Thus, while the deflector 30 is preferably extended and/or air is preferably injected to decrease the throat area of the exhaust nozzle 12 during dry operation, the deflector 30 can also extended and/or air may also be injected during afterburning or non-afterburning operation to vary the thrust vector angle 46 and to provide additional directional control.

Accordingly, in embodiments of the present invention in which a non-symmetrical distribution of separated regions is employed, the vector direction of the exhaust flow can be changed, thereby providing a mechanism for thrust vectoring in a nozzle with a simple, fixed geometry throat area control system. More particularly, the use of separated flow regions 32 produced by the method and apparatus of the present invention will enable control of the nozzle throat area and thrust vector with relatively simple systems which could significantly reduce nozzle complexity, while increasing producibility and affordability. These advantages result because the engine throat area can be made of a fixed geometry section, sized for operation at afterburning conditions. Because the throat area control apparatus of the present invention does not include numerous, large, moving flaps, the hot gas seals, and the multitude of hinges and like components of conventional thrust vector control systems are also eliminated.

The aircraft engine 10 and exhaust nozzle of the present invention control the throat area of the exhaust nozzle 12 to promote efficient operation of the aircraft engine. The exhaust nozzle 12 of the present invention also provides gradual expansion of the gas flowing therethrough to prevent or reduce shock waves and any resulting shock loss. In addition, the exhaust nozzle 12 of the present invention allows control of the expansion ratio and the thrust vector angle 46 produced by the gas exiting the exhaust nozzle 12. Further, by eliminating the numerous moving flaps of conventional afterburners, the design and manufacture of the exhaust nozzle 12 of the present invention is simplified, the reliability of the exhaust nozzle is improved, the signature, such as the infrared observability, of the exhaust nozzle is reduced, and the cost to produce and support the nozzle is greatly reduced.

In the drawings and the specification, there has been set forth a possible embodiment of the invention and, although specific terms are employed, the terms are used in a generic and descriptive sense only and not for purpose of limitation, the scope of the invention being set forth in the following claims.

What is claimed is:

1. An exhaust nozzle of an aircraft engine defining a longitudinal axis and a throat area therein, the exhaust nozzle comprising:

inlet means for receiving gas exhausted from an aircraft engine;

means for deflecting at least some of the exhausted gas within the exhaust nozzle to produce a separated flow region having a relatively low gas flow rate and a second region having a relatively high gas flow rate wherein the transverse cross-sectional area of the second region defines the throat area of the exhaust nozzle; and means for smoothly expanding the deflected gas within the exhaust nozzle, wherein said means for smoothly expanding the deflected gas comprises a ridge projecting inwardly within the exhaust nozzle.

2. An exhaust nozzle according to claim 1 wherein said means for deflecting at least some of the exhausted gas comprises:

at least one deflector; and actuating means for projecting said deflector into the flow pattern of the exhausted air such that said deflector alters the flow pattern of at least some of the gas.

3. An exhaust nozzle according to claim 2 wherein said means for deflecting at least some of the exhausted gas further comprises means for injecting gas into the exhausted gas to alter the flow pattern of at least some of the exhausted gas.

4. An exhaust nozzle according to claim 1 wherein said ridge has a smoothly sloped profile in longitudinal cross-section.

5. An exhaust nozzle according to claim 4 wherein said ridge is downstream of said means for deflecting at least some of the exhausted gas.

6. An exhaust nozzle according to claim 1 further comprising outlet means, downstream of said expansion means, for discharging the smoothly expanded gas wherein said means for deflecting at least some of the exhausted gas further comprises control means for varying the thrust vector angle defined by the gas exiting the exhaust nozzle through said outlet means.

7. An exhaust nozzle according to claim 6 wherein said control means comprises:

a plurality of deflectors circumferentially positioned within said nozzle;

actuating means for individually extending said deflectors within said nozzle and into the flow pattern of the exhausted gas such that said deflectors alter the flow pattern of at least some of the exhausted gas; and means for controlling said actuating means such that only predetermined deflectors are extended within said nozzle.

8. An exhaust nozzle according to claim 1 wherein said deflecting means comprises:

a plurality of deflectors circumferentially positioned within the exhaust nozzle; and actuating means for controllably projecting said deflector a predetermined amount into the flow pattern of the exhausted gas such that the relative sizes of the high and low gas flow rate regions are correspondingly altered.

9. An exhaust nozzle according to claim 1 wherein said deflecting means comprises:

means for injecting gas into the exhausted air; and means for controlling the injected gas such that the flow pattern of at least some of the exhausted gas is altered and the relative sizes of the high and low gas flow rate regions are correspondingly altered.

10. An aircraft propulsion apparatus comprising:

an aircraft engine which ignites a first mixture of gas and fuel and exhausts the first mixture following its combustion; and an exhaust nozzle which receives and directs at least some of the exhausted first mixture to thereby control the thrust vector angle of the aircraft engine, said exhaust nozzle comprising:

a nozzle housing defining an inlet port for receiving at least some of the exhausted first mixture and an outlet port, downstream of said inlet port, for discharging at least some of the exhausted first mixture, said nozzle having sidewalls defining a fluid passageway between said inlet port and said outlet port;

means, in said nozzle housing, for deflecting at least some of the exhausted first mixture from a sidewall to produce a separated flow region having a relatively low gas flow rate and a second region having a relatively high gas flow rate; and means, in said nozzle housing and downstream of said deflecting means, for smoothly expanding the deflected first mixture, wherein said means for smoothly expanding the deflected first mixture comprises a ridge projecting inwardly within said exhaust nozzle.

11. An aircraft propulsion apparatus according to claim 10 wherein said means for deflecting at least some of the exhausted first mixture comprises:

at least one deflector; and actuating means for projecting at least one deflector from a sidewall of said nozzle housing and into the flow pattern such that at least one deflector separates at least some of the first mixture from the sidewall.

12. An aircraft propulsion apparatus according to claim 10 said engine nozzle defines at least one air inlet port in a sidewall, and wherein said means for deflecting at least some of the exhausted first mixture further comprises means for injecting gas into the first mixture from said air inlet port to further separate at least some of the first mixture from the sidewall in which said air inlet port is defined.

13. An aircraft propulsion apparatus according to claim 10 wherein said nozzle housing defines a longitudinal axis, and wherein said ridge has a smoothly sloped profile in longitudinal cross-section.

14. An afterburner for increasing the thrust of an associated aircraft engine, the afterburner comprising:

an exhaust nozzle extending from an inlet port to an outlet port and defining a longitudinal axis and a throat area therein;

injecting means, in said engine nozzle, for introducing fuel into gas exhausted by the aircraft engine and received by the inlet port of said engine nozzle;

combustion means, responsive to said injecting means, for igniting a mixture of the introduced fuel and the exhausted gas during afterburning operation of the aircraft engine;

means for deflecting at least some of the exhausted gas within the exhaust nozzle to produce a separated flow region having a relatively low gas flow rate and a second region having a relatively high gas flow rate wherein the transverse cross-sectional area of the second region defines the throat area of the exhaust nozzle; and means for smoothly expanding the deflected air, said means for smoothly expanding the deflected mixture further comprising a ridge projecting inwardly within said afterburner downstream of said deflecting means.

15. An afterburner according to claim 14 wherein said deflecting means comprises:

at least one deflector; and actuating means for projecting said at least one deflector into the flow pattern of the exhausted air such that said at least one deflector alters the flow pattern of at least some of the gas.

16. An afterburner according to claim 14 wherein said deflecting means comprises means for injecting additional gas into the exhausted gas to alter the flow pattern of at least some of the exhausted gas.

17. An afterburner according to claim 16 wherein said gas injecting means comprises:

a plurality of inlet ports positioned circumferentially within said exhaust nozzle; and means for controllably injecting gas through predetermined ones of said inlet ports and into the flow pattern of the exhausted gas such that the injected gas alters the flow pattern of at least some of the exhausted gas.

18. An afterburner according to claim 14 wherein said ridge has a smoothly sloped profile in longitudinal cross-section.

19. A method of controlling the throat area of an exhaust nozzle of an aircraft engine, the method comprising the steps of:

providing an exhaust nozzle having a ridge projecting inwardly therein;

directing gas exhausted from the aircraft engine through the exhaust nozzle, the exhaust nozzle defining a longitudinal axis therethrough; and deflecting at least some of the gas exhausted from the aircraft engine within the exhaust nozzle to produce a separated flow region having a relatively low gas flow rate and a second region having a relatively high gas flow rate;

controlling the relative transverse cross-sectional areas of the separated flow region and second region such that the throat area of the exhaust nozzle is defined by the transverse cross-sectional area of the second region having a relatively high gas flow rate; and smoothly expanding the deflected gas with the ridge which projects inward into the exhaust nozzle.

20. A method of controlling the throat area of an exhaust nozzle according to claim 19 wherein said step of deflecting at least some of the exhausted gas comprises the step of projecting a deflector into the flow pattern of the exhausted gas to alter the flow pattern of the gas.

21. A method of controlling the throat area of an exhaust nozzle according to claim 19 wherein said step of deflecting at least some of the, exhausted gas comprises the step of injecting additional gas into the exhausted gas to alter the flow pattern of the gas.

22. A method of controlling the throat area defined by a nozzle having a longitudinal axis extending therethrough, the method comprising the steps of:

providing an exhaust nozzle having a ridge projecting inwardly therein;

receiving a first mixture of air and fuel from an aircraft engine associated with the nozzle; and deflecting a portion of the first mixture received from the aircraft engine to produce a separated flow region having a relatively low gas flow rate and a second region having relatively high gas flow rate, wherein the separated flow region and the second region are within the nozzle, and wherein the throat area is defined by the transverse cross-sectional area of the second region; and smoothly expanding the deflected gas with the ridge which projects inward into the exhaust nozzle.

23. A method of controlling the throat area defined by a nozzle according to claim 22 further comprising the step of smoothly expanding the deflected gas.

24. A method of controlling the throat area defined by a nozzle according to claim 22 wherein said step of deflecting at least some of the first mixture comprises the step of projecting at least one deflector into the flow pattern of the first mixture to alter the flow pattern of the first mixture.

25. A method of controlling the throat area defined by a nozzle according to claim 24 wherein said step of deflecting at least some of the first mixture comprises the step of injecting gas into the first mixture to alter the flow pattern of the first mixture.

* * * * *